United States Patent
Joos et al.

(10) Patent No.: US 7,021,261 B2
(45) Date of Patent: Apr. 4, 2006

(54) METHOD, COMPUTER PROGRAM CONTROL AND REGULATING UNIT FOR OPERATING AN INTERNAL COMBUSTION ENGINE, AS WELL AS AN INTERNAL COMBUSTION ENGINE

(75) Inventors: Klaus Joos, Walheim (DE); Jens Wolber, Gerlingen (DE); Thomas Frenz, Noerdlingen (DE); Markus Amler, Leonberg-Gebersheim (DE); Karsten Hinn, Giessen (DE)

(73) Assignee: Robert Bosch GbmH, Stuttgart (DE)

( * ) Notice: Subject to any disclaimer, the term of this patent is extended or adjusted under 35 U.S.C. 154(b) by 0 days.

(21) Appl. No.: 10/451,478

(22) PCT Filed: Sep. 14, 2002

(86) PCT No.: PCT/DE02/03452

§ 371 (c)(1),
(2), (4) Date: Nov. 20, 2003

(87) PCT Pub. No.: WO03/038260

PCT Pub. Date: May 8, 2003

(65) Prior Publication Data

US 2004/0074479 A1    Apr. 22, 2004

(30) Foreign Application Priority Data

Oct. 18, 2001 (DE) ................................ 101 51 513

(51) Int. Cl.
*F02D 41/00* (2006.01)

(52) U.S. Cl. ............................................... 123/179.17

(58) Field of Classification Search ........... 123/179.16, 123/179.17, 497, 446; 701/113
See application file for complete search history.

(56) References Cited

U.S. PATENT DOCUMENTS

| | | | |
|---|---|---|---|
| 3,973,537 A | | 8/1976 | Williams et al. |
| 5,175,663 A | * | 12/1992 | Iwabuchi et al. ........... 361/152 |
| 5,572,964 A | * | 11/1996 | Cogneville et al. .... 123/179.17 |
| 5,617,831 A | | 4/1997 | Shirakawa |
| 5,842,454 A | * | 12/1998 | Miwa et al. ................. 123/497 |
| 5,884,597 A | * | 3/1999 | Hiraku et al. .......... 123/179.17 |
| 5,927,253 A | * | 7/1999 | Oyafuso et al. ............ 123/456 |
| 6,073,597 A | * | 6/2000 | Harata et al. .......... 123/179.14 |
| 6,276,340 B1 | * | 8/2001 | Kato .......................... 123/491 |
| 6,408,822 B1 | * | 6/2002 | Rembold et al. ........... 123/447 |

FOREIGN PATENT DOCUMENTS

| | | |
|---|---|---|
| DE | 36 17 247 A1 | 11/1987 |
| DE | 196 11 719 A1 | 10/1996 |
| DE | 198 18 421 A1 | 10/1999 |
| DE | 199 61 298 | 6/2001 |
| DE | 100 14 550 | 10/2001 |

* cited by examiner

*Primary Examiner*—Thomas Moulis
(74) *Attorney, Agent, or Firm*—Kenyon & Kenyon (57) ABSTRACT

In an internal combustion engine, the fuel is conveyed by an electrically driven fuel pump. The intake side of this pump is connected to a fuel tank and its outlet side is connected to a pressure region. A prerun of the electrically driven fuel pump may be performed before the startup of the internal combustion engine. In order to increase the service life of the fuel pump, an actual pressure (pactual) in the pressure region may be detected by a pressure sensor and the execution of the prerun be a function of at least the signal of the pressure sensor.

13 Claims, 5 Drawing Sheets

METHOD, COMPUTER PROGRAM CONTROL AND REGULATING UNIT FOR OPERATING AN INTERNAL COMBUSTION ENGINE, AS WELL AS AN INTERNAL COMBUSTION ENGINE

FIELD OF THE INVENTION

The present invention relates to a method of operating an internal combustion engine, in which the fuel is conveyed by an electrically driven fuel pump, whose intake side is connected to a fuel tank and whose outlet side is connected to a pressure region, and in which a prerun of the electrically driven fuel pump may be performed before the internal combustion engine is started, an actual pressure in the pressure region being detected by a pressure sensor and the execution of the prerun being a function of at least the signal of the pressure sensor.

BACKGROUND INFORMATION

In a conventional method, the fuel is conveyed from a fuel tank into a pressure region by an electrical fuel pump. A fuel injector is connected to this region. This injector is in turn positioned in an intake manifold of the internal combustion engine. In this manner, the fuel may reach the intake manifold via the fuel injector and from there reach the combustion chambers of the internal combustion engine. A further method of the type initially cited is known from internal combustion engines which operate using gasoline direct injection. In these internal combustion engines, the fuel is conveyed by an electrical fuel pump, which is also referred to as a "presupply pump," from the fuel tank into a pressure region, and from there reaches a high-pressure fuel pump ("main supply pump"), which is generally mechanically driven. This pump conveys the fuel further into a common fuel line ("rail"). Multiple injectors are connected to this rail, and the fuel is stored at high pressure therein. The injectors each inject the fuel directly into the corresponding combustion chambers of the internal combustion engine.

If the electrical fuel pump and the pressure region positioned downstream from it are configured as a "constant-pressure system," the pressure region is connected via a mechanical pressure regulator to the fuel tank. In normal operation, the electrically driven fuel pump conveys the fuel continuously and at the maximum output rate. In the known internal combustion engines and/or the known methods, any quantity of fuel which is not sprayed into the intake manifold by the fuel injector in systems having intake manifold injection, and which is not conveyed further by the high-pressure pump in systems having gasoline direct injection, flows back into the fuel tank via the mechanical pressure regulator.

Since the electrically driven fuel pump runs continuously at the maximum output rate, it is ensured that the pressure in the pressure region always remains at the desired level, even if the maximum possible quantity of fuel is demanded by the fuel injector and/or the injectors.

Demand-controlled fuel systems are also known. These are also constant-pressure systems, in which the pressure in the pressure region is set to a constant value through the activation of a mechanical pressure regulator. The fuel pump is therefore no longer activated fully, i.e., continuously at maximum output, but rather only according to the demand of the internal combustion engine. The excess quantity of fuel flows back into the tank via a mechanical pressure regulator. The adjustment of the conveyance output to the instantaneous operating point of the internal combustion engine causes a savings in fuel, since the drive output of the electrically driven fuel pump may be reduced in many operating ranges of the internal combustion engine.

During startup of the internal combustion engine, sufficient pressure must be provided in the pressure region of the fuel system so that the fuel reaches the combustion chambers of the internal combustion engine in the desired manner. Typically, it is assumed that the pressure of the fuel in the pressure region falls to ambient pressure after the internal combustion engine is shut off. In order to be able to achieve a desired pressure for starting the internal combustion engine, at least the quantity of fuel necessary for compressing the fuel to the desired pressure must therefore be conveyed. The expansion of the fuel system during the pressure buildup must also be taken into consideration. In some known methods, the operating time of the fuel pump, which is driven at constant output, during the prerun is a function of the period of time which has passed since the internal combustion engine was shut off.

Using the shutoff time of the engine, a fuel system pressure, the number of pump preruns which have already occurred, etc., for example, as criteria for requiring a fuel pump prerun is described in German Published Patent Application No. 199 61 298.

German Published Patent Application No. 100 14 550 describes the possibility of controlling the fuel pressure during the prerun on the basis of a pressure sensor by changing the speed of the fuel pump.

In this method, the conveyance output of the electrically driven fuel pump during the prerun is tailored to the particular demand. This demand is defined by the signal provided by the pressure sensor. If the pressure sensor signals that the pressure in the pressure region is lower than desired, the electrical fuel pump is activated accordingly. In contrast, if the pressure sensor signals that the pressure in the pressure region already corresponds to the desired pressure, the electrical fuel pump remains switched off.

SUMMARY

It is an object of the present invention to provide a method such that the internal combustion engine may start even more reliably and, at the same time, the prerun of the electrically driven fuel pump may be as short as possible.

This object may be achieved in a method such that the electrical fuel pump is initially operated at maximum output during a prerun.

An example embodiment of the method according to the present invention may provide that it may be ensured that the pressure of the fuel in the pressure region necessary for an optimum start of the internal combustion engine is reached as rapidly as possible during the prerun, and the electrical fuel pump may only be activated for the shortest possible time. This may facilitate and accelerate starting the internal combustion engine, since the fuel pressure necessary for this purpose is reached very rapidly.

In an example embodiment, the execution of the prerun may be a function of whether a prerun has already been performed in the current operating cycle. In this manner, a prerun of the electrical fuel pump may be prevented from being executed after a vehicle in which the internal combustion engine is installed is briefly switched off and started. This also may avoid the electrical fuel pump from being put into operation unnecessarily.

Furthermore, a prerun of the electrical fuel pump may be executed if the actual pressure is at least equal to a specific value or lower than a specific value and/or the prerun may be ended if the actual pressure reaches or exceeds a specific value. This procedure may also shorten the operating time of the electrical fuel pump.

Alternatively or additionally, it is possible for the prerun of the electrical fuel pump to be ended if the duration of the prerun reaches or exceeds a specific value. This may prevent the electrical fuel pump from running too long if it is impossible to build up pressure in the fuel system (therefore, this provides a type of "safety cutoff"). In the event of cold external temperatures, the batteries which supply the electrical fuel pump may also be prevented from being overloaded by an excessively long prerun of the electrical fuel pump.

A possibility of reaching the maximum output during the prerun of the electrical fuel pump which is easy to implement is for the output of the fuel pump to be influenced by a PI regulator as a function of the difference between the detected pressure and a setpoint pressure in the pressure region, and by a precontroller as a function of the setpoint pressure, and for the integrator of the PI regulator to be initialized as follows for a prerun of the electrical fuel pump: maximum possible activation output minus normal precontrol output minus activation output of the P component of the PI regulator.

As an alternative, it is possible for the output of the fuel pump to be influenced by a PI regulator as a function of the difference between the detected pressure and a setpoint pressure in the pressure region and by a precontroller as a function of the setpoint pressure and, for a prerun of the electrical fuel pump in the precontroller, for an additional prerun precontrol output to be added to the normal precontrol output in such a manner that the overall precontrol output is initially at a maximum. This may be implemented using software and may ensure that the pressure in the pressure region is built up at maximum rate. However, this method may simultaneously prevent an overshoot occurring after the end of the prerun of the electrical fuel pump. This is a concern if the integrator of the PI regulator is initialized using a relatively high value. Because the activation of the electrical fuel pump at maximum output is caused by the precontroller in this case, an initialization of this type is not necessary.

In a refinement to this procedure, the additional precontrol output may be produced by giving the value zero to the input of a low-pass filter at the beginning of the prerun of the electrical fuel pump and the low-pass filter may be initialized using the following value: maximum possible activation output minus normal precontrol output. In this case, as above, the normal precontrol output is understood as the precontrol output which results from the instantaneous setpoint pressure in the pressure region of the fuel system. Such a method may be implemented using software. Through the low-pass filter, the electrical fuel pump is initially operated at maximum output. The additional precontrol output is therefore initially at maximum (it corresponds to the difference of maximum possible activation output and normal precontrol output) and then falls to zero following an exponential function.

In this case, the time constant of the low-pass filter may be a function of the difference between the actual pressure and the setpoint pressure in the pressure region. In this case, the setpoint pressure may be a value which is not subjected to a limitation of the maximum gradients, as is typical. If the difference between actual pressure and setpoint pressure is very large, the additional precontrol output decays relatively slowly to zero. If the difference is small, the decay occurs more rapidly.

Furthermore, the setpoint pressure in the pressure region may be a function of the temperature in a region of the internal combustion engine, at least for the prerun of the electrical fuel pump. If the internal combustion engine is warm, possibly existing vapor bubbles may be compressed by an elevated pressure in the pressure region. If the internal combustion engine is cold, in contrast, the prerun time may be shortened with this example embodiment.

The present invention also relates to a computer program which is suitable for performing the method above when it is executed on a computer. In this case, the computer program may be stored in a memory, e.g., in a flash memory, a ferrite RAM, etc.

Furthermore, the present invention relates to a control and/or regulating unit for operating an internal combustion engine in which the fuel is conveyed by an electrically driven fuel pump, whose intake side is connected to a fuel tank and whose outlet side is connected to a pressure region. In order to improve the start quality of the internal combustion engine and to reduce the exhaust gas emissions during starting, the control and/or regulating unit may include a memory in which a computer program of the type above is stored.

Furthermore, the present invention relates to an internal combustion engine including a fuel system, which includes a fuel tank, an electrically driven fuel pump, whose intake side is connected to the fuel tank and whose outlet side is connected to a pressure region, a prerun of the electrically driven fuel pump being executable before starting the internal combustion engine, and a pressure sensor being provided which detects an actual pressure in the pressure region, and the execution of the prerun being a function of at least the actual pressure. In order to improve the start quality of the internal combustion engine and to reduce the exhaust gas emissions during starting, the internal combustion engine may include a control and/or regulating unit of the type above.

DETAILED DESCRIPTION

Figure 1:
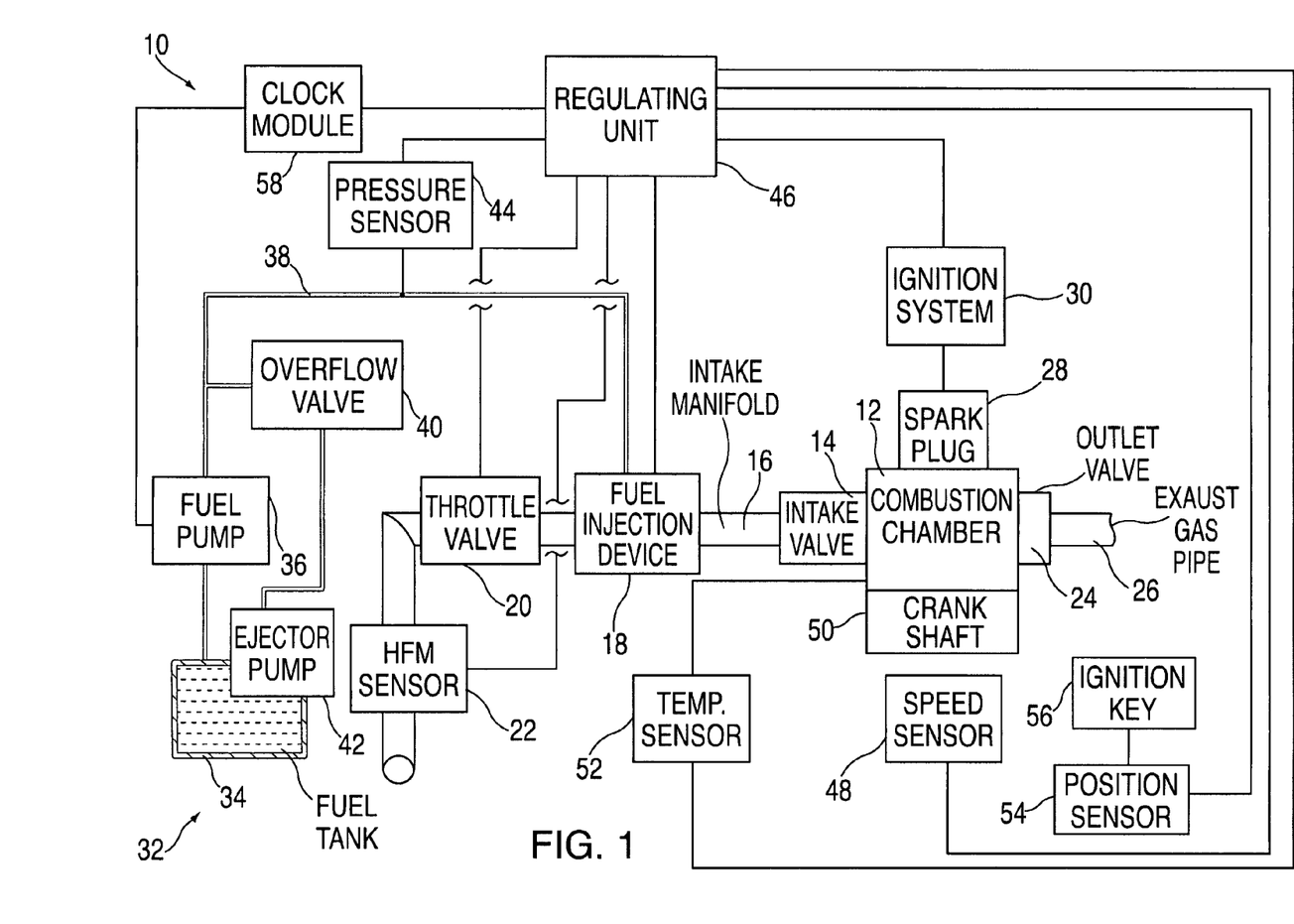
FIG. 1 is a schematic illustration of an internal combustion engine including an electrical fuel pump.

In FIG. 1, an internal combustion engine is indicated as a whole by reference number 10. It includes multiple combustion chambers, only one of which is illustrated in FIG. 1, using reference number 12. Combustion chamber 12 may be connected to an intake manifold 16 via an intake valve 14. A fuel injection device 18 is positioned in intake manifold 16. A throttle valve 20 and an air mass meter 22, implemented as a hot film sensor ("HFM sensor") are also located upstream from fuel injection device 18 in the intake manifold. Combustion chamber 12 may be connected to an exhaust gas pipe 26 via an outlet valve 24. A fuel-air mixture in combustion chamber 12 may be ignited by a spark plug 28. This spark plug is activated by an ignition system 30.

Fuel injection device 18 is part of a fuel system 32. This system includes a fuel tank 34, from which an electrically driven fuel pump 36 conveys the fuel into a fuel line 38, which leads to fuel injection device 18. Fuel line 38 is connected to an overflow valve 40 downstream from electrically driven fuel pump 36. A line (without reference number) leads from this valve to an ejector pump 42, which is arranged in the region of fuel tank 34.

The fuel pressure existing in fuel line 38 is detected by a pressure sensor 44. This sensor supplies appropriate signals to a control and regulating unit 46, which also receives signals from HFM sensor 22 and a speed sensor 48, which picks up the speed of a crankshaft 50 of internal combustion engine 10. Furthermore, signals from a temperature sensor 52, which detects the temperature of an engine block of internal combustion engine 10, are supplied to control and regulating unit 46. A position sensor 54, which detects the position of an ignition key 56, is also connected to control and regulating unit 46. Electrically driven fuel pump 36, overflow valve 40, ejector pump 42, and pressure sensor 44 may be implemented as one module in fuel tank 34.

On the output side, control and regulating unit 46 activates, among other things, ignition system 30, throttle valve 20, and fuel injection device 18. Furthermore, the activation output of electrical fuel pump 36 is also set by control and regulating unit 46. This is performed by activating a clock module 58, which outputs a pulse duty factor. The activation output of electrically driven fuel pump 36 is thus varied via pulse width modulation (PWM).

Figure 2:
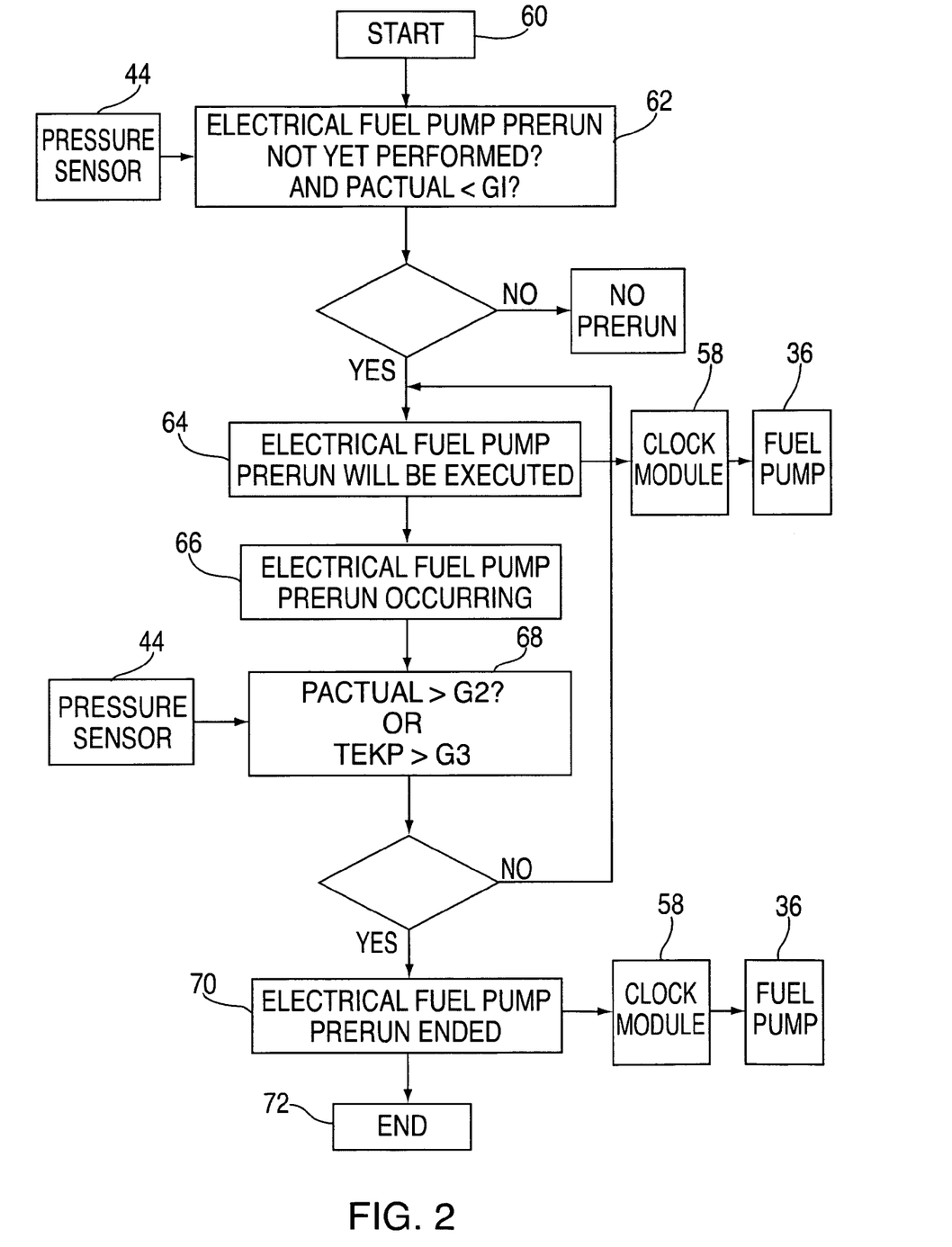
FIG. 2 is a flow chart which illustrates a method of executing a prerun of the electrical fuel pump from FIG. 1.

For starting internal combustion engine 10 (i.e., as soon as the ignition is switched on), the procedure is as follows, as illustrated in FIG. 2: after a starting block 60, it is queried in a block 62 whether a prerun of electrical fuel pump 36 has already occurred in the current operating cycle and whether an actual pressure pactual detected by pressure sensor 44 is lower than a limit value G1. The start in block 60 is initiated when a specific position of ignition key 56 is detected by position sensor 54. The query as to whether a prerun of electrical fuel pump 36 has already occurred in the current operating cycle is performed by checking a bit B1. This check provides the result "false" if a prerun of electrical fuel pump 36 has already occurred in the current operating cycle.

If one of the two conditions or both conditions are not fulfilled in block 62, no prerun is executed. In contrast, if both conditions are fulfilled, clock module 58 is activated in block 64 and electrical fuel pump 36 is put into operation. The activation output, whereby electrical fuel pump 36 is activated, is calculated according to a method which is described in greater detail below in connection with FIGS. 3 to 5.

In block 66, bit B1 is set, indicating that a prerun of electrical fuel pump 36 was executed in the current operating cycle. As long as a prerun of the electrical fuel pump is being executed, a bit B2 is set. In block 68, it is queried whether actual pressure pactual of the fuel in fuel line 38 is greater than or equal to a limit value G2. In the present case, both limit values are identical. However, limit values G1 and G2 may also be different. In addition, it is queried in block 68 whether period tekp, which corresponds to the operating time of electrical fuel pump 36 during the prerun, is greater than or equal to a limit value G3. When one of the two conditions is fulfilled, the prerun of electrical fuel pump 36 is ended in block 70. In order to save calculating time, the conditions for a prerun of the electrical fuel pump are no longer calculated when the internal combustion engine is in normal operation. This is also determined by querying an appropriate bit.

Figure 3:
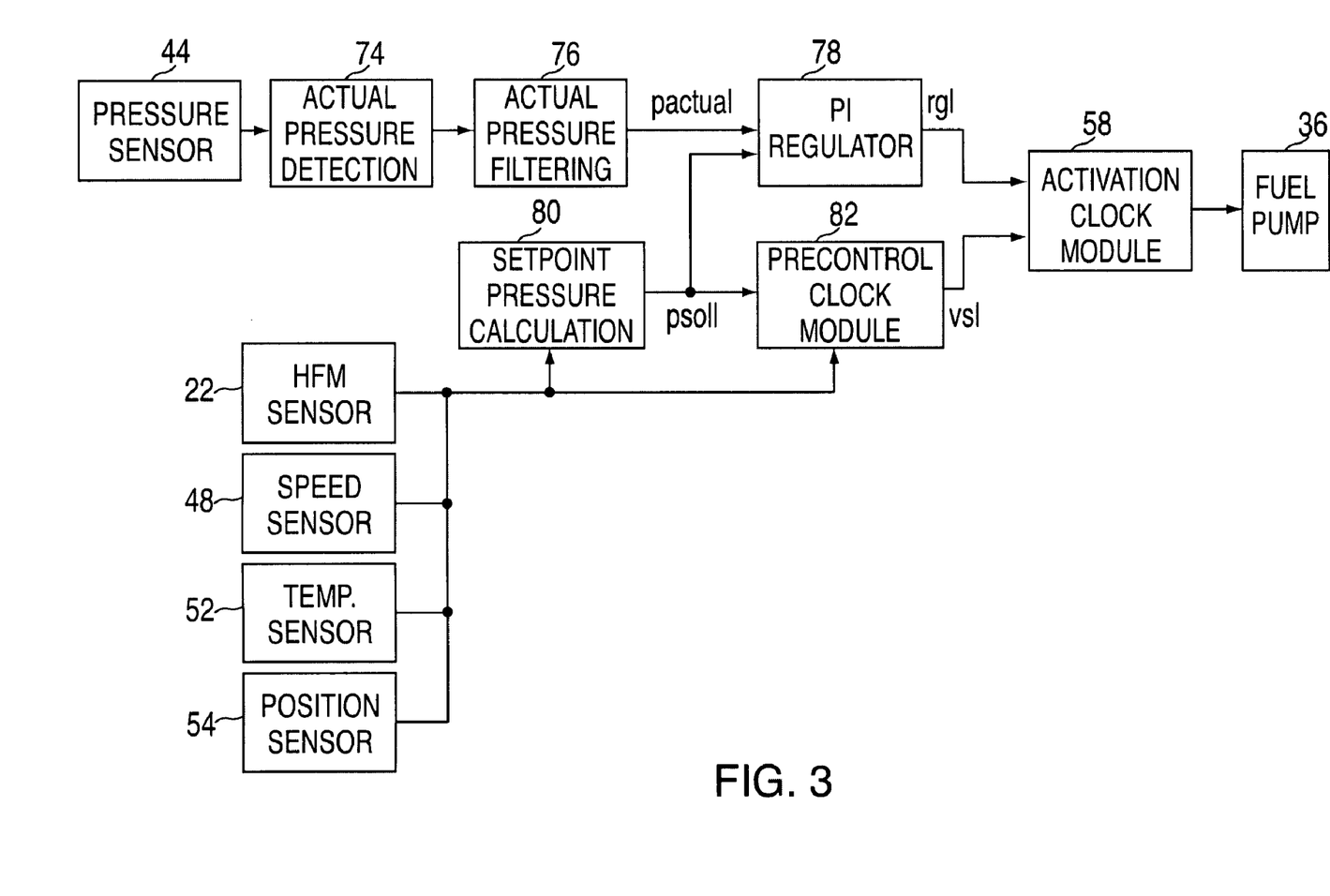
FIG. 3 is a flow chart which illustrates a method of determining the activation output of the electrical fuel pump for the prerun in FIG. 2, the method including a precontroller and a PI regulator.

In the internal combustion engine illustrated in FIG. 1, the activation output of electrical fuel pump 36 is determined as a function of, among other things, actual pressure pactual and a setpoint pressure pset in a combination including a PI regulator and a precontroller. The setpoint value for the pressure in fuel line 38 is primarily a function of the current operating parameters of internal combustion engine 10, e.g., of the temperature of internal combustion engine 10 detected by temperature sensor 52, the speed of crankshaft 50 detected by speed sensor 58, the air charge detected by HFM sensor 22, and the position of ignition key 56 detected by position sensor 54. The pressure in fuel line 38 is set by an appropriate variation of the voltage (and consequently the speed and/or the torque) of fuel pump 36. The determination of the activation output of electrical fuel pump 36 is illustrated in a more general form in FIG. 3:

Subsequently, actual pressure pactual in fuel line 38 is detected in block 74. The corresponding signal is provided by pressure sensor 44. In actual pressure detector 74, the voltage signal provided by pressure sensor 44 is averaged over ten measurement values and this average voltage value is converted into a raw pressure value via a pressure-voltage characteristic curve of pressure sensor 44. The raw pressure value is filtered in a block 76, from which actual pressure pactual results, and this pressure value pactual is supplied to a PI regulator (block 78).

The signals of HFM sensor 22, speed sensor 48, temperature sensor 52 (and possibly, for example, also position sensor 54 of ignition key 56 or signals resulting therefrom) are used in a block 80 to calculate a setpoint pressure pset. This pressure is also supplied to PI regulator 78. In accordance with the difference between setpoint pressure pset and actual pressure pactual, a regulator output rgl is determined in PI regulator 64, in normal operation of internal combustion engine 10. This output is produced in the form of a specific pulse duty factor, as is typical for pulse width modulation. Setpoint pressure pset and the signals of sensors 22, 48, 52, and 54 are also used, however, in block 82 for generating a precontrol output vsl.

Figure 4:
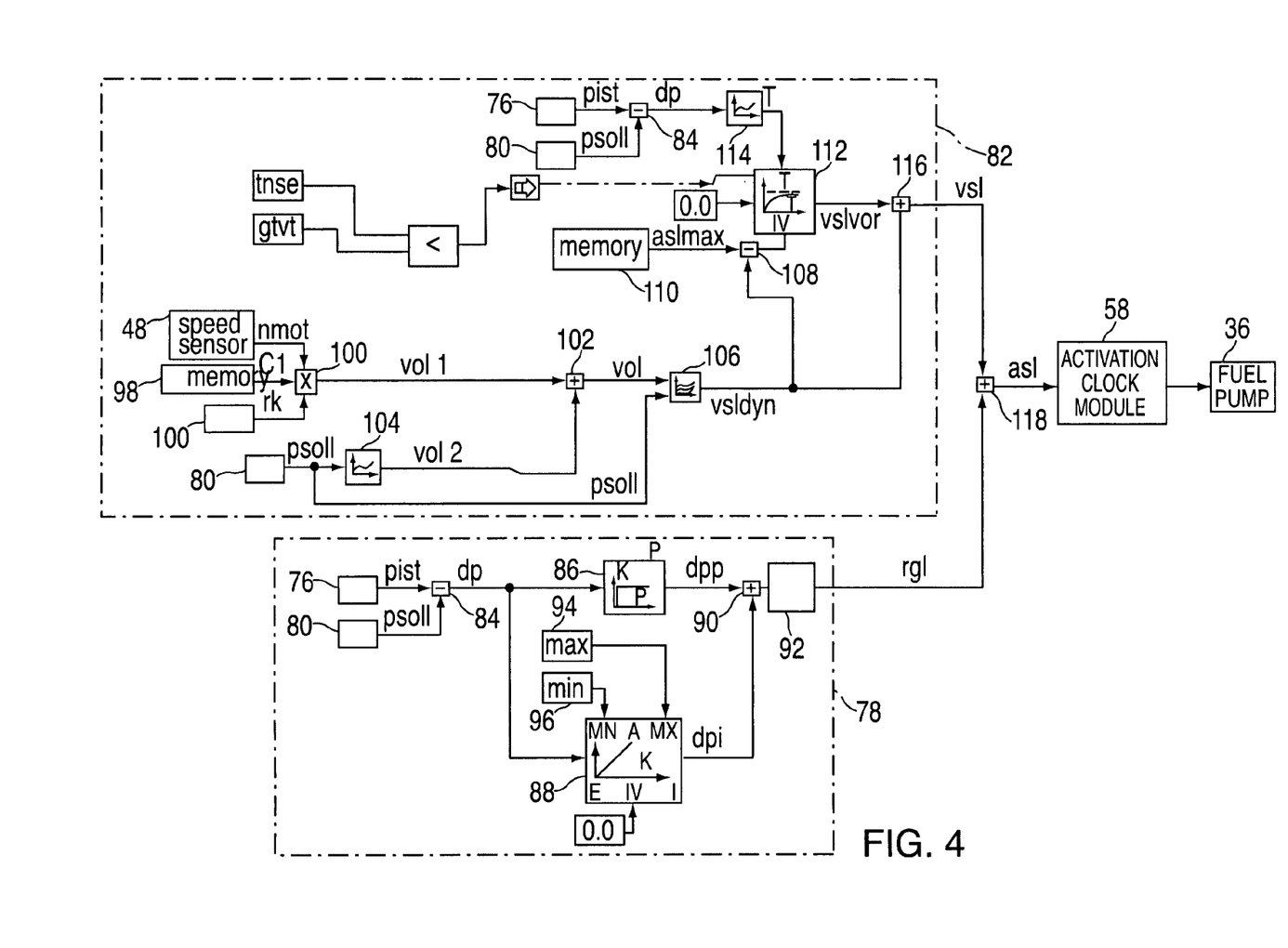
FIG. 4 is a flow chart which illustrates a first possibility for determining the activation output of the electrical fuel pump for the prerun in detailed form.

The determination of the precontrol output for a prerun of electrical fuel pump 36 may occur in various manners. The goal is to provide a desired pressure in fuel line 38 as rapidly as possible. For this purpose, electrical fuel pump 36 is to be activated using maximum output at least at the beginning of the prerun. A possibility for providing this maximum activation output at the beginning of the prerun is illustrated in FIG. 4. In this case, the special requirements of the prerun of electrical fuel pump 36 are taken into consideration in precontroller 82. Firstly, however, the determination of normal regulator output rgl and normal precontrol output vsl for the normal dynamic operation of electrical fuel pump 36 (i.e., when internal combustion engine 10 is running) will be described with reference to FIG. 4:

A regulator output rgl for the dynamic operation of electrical fuel pump 36 is determined as follows: in PI regulator 78, difference dp between setpoint pressure pset and actual pressure pactual is formed in 84. This difference dp is fed into a proportional regulator 86 and an integrator 88. Proportional regulator 86 provides a proportional component dpp, and integrator 88 provides an integral component dpi. Both components dpp and dpi are added in 90 and converted into regulator output rgl in block 92. In order to prevent overload of integrator 88, integral component dpi is delimited by limit values max and min, which are provided in memories 94 and 96.

Precontrol output vsldyn for dynamic operation is determined as follows: a fuel volumetric flow vol1 is determined from speed nmot, which is provided by speed sensor 48, a motor constant C1, which is stored in a memory 98, and relative fuel mass rk, which is provided in block 100 by multiplication in 100. This fuel volumetric flow is the volumetric flow which reaches combustion chamber 12 through fuel injection device 18 during operation of internal combustion engine 10.

A second component vol2 is added to this fuel volumetric flow vol1 in 102. This volumetric flow is established in turn from a characteristic curve 104, which is addressed using setpoint pressure pset. Fuel volumetric flow vol2 is the volumetric flow which flows from fuel line 38 via overflow valve 40 (which may also be implemented as a pressure relief valve) to ejector pump 42 and/or back into fuel tank 34. The sum of both components vol1 and vol2 provides the overall fuel volumetric flow vol to be conveyed by electrical fuel pump 36. This sum is fed, together with setpoint pressure pset, into a characteristic map 106, which outputs precontrol output vsldyn for dynamic operation of electrical fuel pump 36.

Now regarding the determination of activation output asl during a prerun of electrical fuel pump 36: in order to be able to initially activate electrical fuel pump 36 at maximum output during a prerun of this pump, the difference between maximum permissible activation output aslmax of electrical fuel pump 36 and precontrol output vsldyn for dynamic operation is formed in precontroller 82 if a prerun is to be executed. Maximum permissible activation output aslmax is stored in a memory 110 and is a function, for example, of clock module 58 used, which generates a pulse duty factor (the output pulse duty factor is a function of the input pulse duty factor).

A low-pass filter 112 is initialized using the difference formed in 108. A time constant T of low-pass filter 112 is determined in 114 using a characteristic curve, into which difference dp between actual pressure pactual and setpoint pressure pset is fed. Setpoint pressure pset is free in this case of a gradient delimitation, while in contrast it is gradient-delimited for the determination of fuel volumetric flow vol2 and for the use in regulator 78. The value zero is given to the input of low-pass filter 112. The output of low-pass filter 112 provides a precontrol output vslvor for the prerun of electrical fuel pump 36. In 116 this output is added to precontrol output vsldyn for the dynamic operation of internal combustion engine 10 and results in total precontrol output vsl. In 118, this output is added in turn to regulator output rgl and provides overall activation output asl.

Activation output asl for a prerun of electrical fuel pump 36 is determined as follows: since internal combustion engine 10 is not yet in operation during the prerun of electrical fuel pump 36 and therefore crankshaft 50 does not yet rotate, the multiplication in 100 results in the value zero. Precontrol output vsldyn for the dynamic operation of internal combustion engine 10 thus results exclusively from fuel volumetric flow vol2 and setpoint pressure pset. In the prerun of electrical fuel pump 36, setpoint pressure pset results from a characteristic map as a function of speed nmot and a load rl or, as in the present case, from the temperature of internal combustion engine 10, which is provided by temperature sensor 52.

However, precontrol output vsldyn determined in 106 for the dynamic operation of internal combustion engine 10 is relatively low. A condition signals that a prerun is to occur and enables low-pass filter 112. The condition is that if a time tnse is less than a limit value gtvt, low-pass filter 112 is enabled. Due to the initialization of low-pass filter 112 using the difference between precontrol output vsldyn and maximum permissible activation output aslmax, precontrol output vslvor for the prerun of electrical fuel pump 36 initially corresponds exactly to this difference. Since this difference is added in 116 to precontrol output vsldyn for the dynamic operation, precontrol output vsl at the beginning of the prerun of electrical fuel pump 36 corresponds to maximum permissible activation output aslmax of electrical fuel pump 36. Electrical fuel pump 36 thus initially rotates at maximum speed and maximum output, so that the pressure in fuel line 38 is built up at maximum speed. As was explained above, time constant T of low-pass filter 112 is formed as a function of the difference between setpoint pressure pset and actual pressure pactual. A large difference results in a comparatively large time constant T, while a small difference results in a correspondingly small time constant T. This means that with a large difference between pset and pactual, precontrol output vsl decays slower from the initialization value to zero than with a small difference. Since in this manner the difference between actual pressure pactual and setpoint pressure pset is to become smaller relatively rapidly during the prerun of electrical fuel pump 36, a large integral component dpi does not built up in integrator 88 of PI regulator 78, so that an overshoot due to the regulator is avoided when actual pressure pactual reaches setpoint pressure pset. In addition, an overflow of the integrator is prevented in that the integrator is stopped by an appropriate bit when the maximum pulse duty factor is output, but actual pressure pactual is simultaneously less than setpoint pressure pset.

Figure 5:
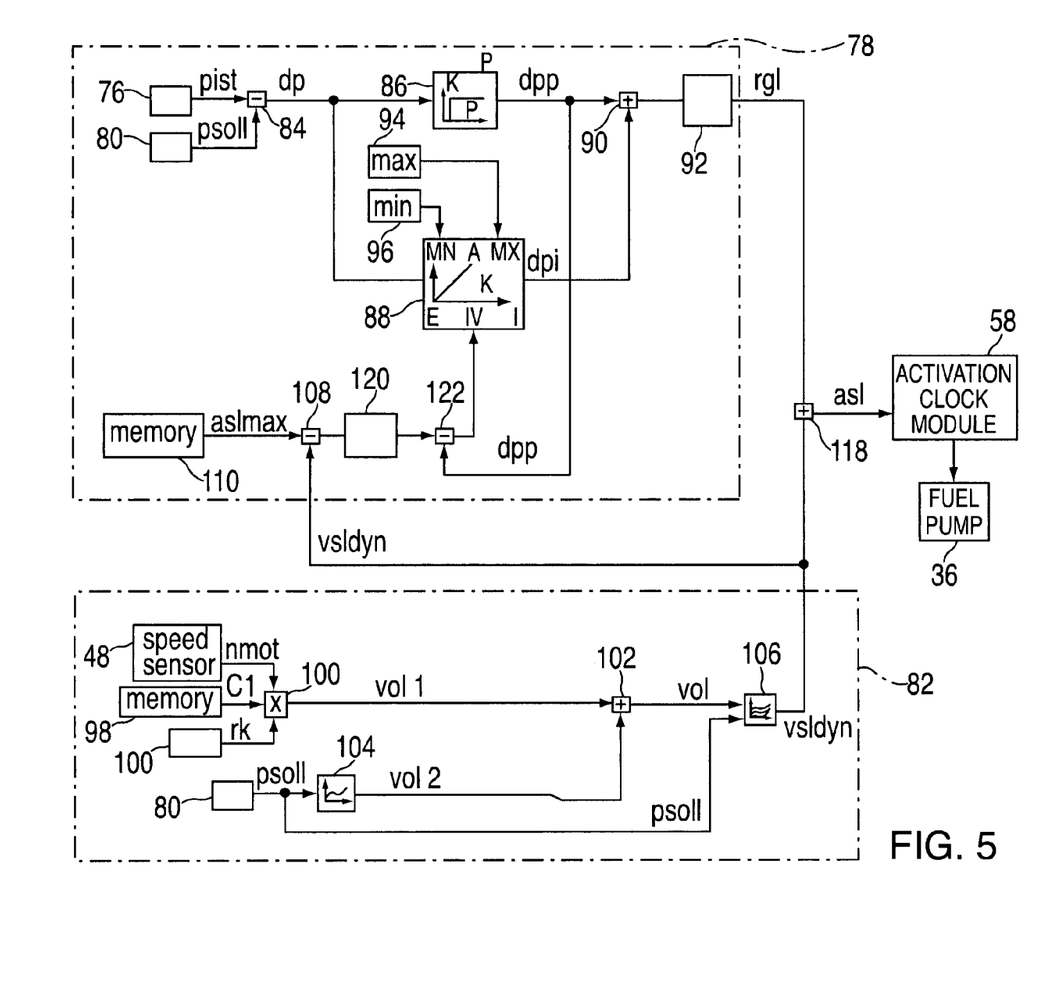
FIG. 5 is a flow chart similar to FIG. 4, which illustrates another possibility for determining the activation output of the electrical fuel pump for the prerun.

A second possibility, using which activation output asl of electrical fuel pump 36 may be established during a prerun of electrical fuel pump 36, is illustrated in FIG. 5. Those functions which may ensure that electrical fuel pump 36 is activated at maximum output at the beginning of the prerun are implemented in FIG. 5 not in precontroller 82, but rather in PI regulator 78. It is to be noted at this point that those elements, blocks, and functions which may be functionally similar to elements, blocks, and functions of FIG. 4 have identical reference numbers and are not explained again in detail in each case.

Similarly to FIG. 4, a precontrol output vsldyn for the dynamic operation of internal combustion engine 10 is determined in block 82. Also similarly to FIG. 4, the difference between maximum permissible activation output aslmax of electrical fuel pump 36 and precontrol output vsldyn for the dynamic operation of internal combustion engine 10 is formed in 108. This difference is converted in 120 into a pressure value, from which proportional component dpp, which was established in proportional regulator 86, is subtracted in 122. Integrator 88 is initialized using the value resulting therefrom.

As a result, at the beginning of a prerun of electrical fuel pump 36, regulator output rgl, resulting from the sum of proportional component dpp and integral component dpi in 90, i.e., 92, is equal to the difference between maximum permissible activation output aslmax of electrical fuel pump 36 and precontrol output vsldyn for the dynamic operation of internal combustion engine 10. Since regulator output rgl is added in 118 to precontrol output vsldyn, an activation output asl which is equal to maximum permissible activation output aslmax results at the beginning of the prerun of electrical fuel pump 36. As the difference between actual pressure pactual and setpoint pressure pset becomes smaller, the regulator output then falls again, so that total activation output asl is also reduced.

It is to be noted that the initialization of integrator 88 as illustrated in FIG. 5 and the determination of precontrol output vslvor as illustrated in FIG. 4 is performed each time the condition "ignition on" is detected (initialization of the engine control unit). Therefore, both steps are performed during a prerun of electrical fuel pump 36 and during a normal start of internal combustion engine 10 without a prerun. It is also to be noted that the concept of "output" used in connection with FIGS. 3 through 5 may also be expressed in practice by a voltage value, a current value, or a pulse duty ratio.

What is claimed is:

1. A method of operating an internal combustion engine, comprising:
    delivering a fuel by an electrically driven fuel pump that includes an intake side connected to a fuel tank and an outlet side connected to a pressure region;
    detecting an actual pressure in the pressure region by the pressure sensor; and
    executing a prerun of the electrically driven fuel pump before startup of the internal combustion engine as a function of at least a signal of the pressure sensor, the prerun including operating the electrical fuel pump initially at maximum output and thereafter at an output level dependent on the signal provided by the pressure sensor.

2. The method of claim 1, wherein the prerun is executed as a function of whether the prerun has already been executed in a current operating cycle.

3. The method of claim 1, further comprising at least one of the steps of:
    executing the prerun of the electrical fuel pump if the actual pressure is one of at least equal to a first specific value and lower than the first specific value; and
    terminating the prerun of the electrical fuel pump when the actual pressure one of reaches and exceeds a second specific value.

4. The method of claim 1, further comprising the step of:
    terminating the prerun of the electrical fuel pump if a duration of the prerun one of reaches and exceeds a specific value.

5. A method of operating an internal combustion engine, comprising:
    delivering a fuel by an electrically driven fuel pump that includes an intake side connected to a fuel tank and an outlet side connected to a pressure region;
    detecting an actual pressure in the pressure region by the pressure sensor;
    executing a prerun of the electrically driven fuel pump before startup of the internal combustion engine as a function of at least a signal of the pressure sensor, the prerun including operating the electrical fuel pump initially at maximum output;
    influencing an output of the fuel pump by a PI regulator as a function of a difference between the actual pressure and a setpoint pressure in the pressure region and by a precontroller as a function of the setpoint pressure; and
    initializing for the prerun of the electrical fuel pump, an integrator of the PI regulator in accordance with a one of a value of a maximum possible activation output minus a normal precontrol output minus an activation output of a P component of the PI regulator and a value corresponding to the value of the maximum possible activation output minus the normal precontrol output minus the activation output of the P component of the PI regulator.

6. A method of operating an internal combustion engine, comprising:
    delivering a fuel by an electrically driven fuel pump that includes an intake side connected to a fuel tank and an outlet side connected to a pressure region;
    detecting an actual pressure in the pressure region by the pressure sensor;
    executing a prerun of the electrically driven fuel pump before startup of the internal combustion engine as a function of at least a signal of the pressure sensor, the prerun including operating the electrical fuel pump initially at maximum output;
    influencing an output of the fuel pump by a PI regulator as a function of a difference between the actual pressure and a setpoint pressure in the pressure region and by a precontroller as a function of the setpoint pressure; and
    adding, for the prerun of the electrical fuel pump, an additional prerun precontrol output to a normal precontrol output in the precontroller so that an overall precontrol output is initially at a maximum.

7. The method of claim 6, wherein the additional precontrol output is produced in that, at the beginning of the prerun of the electrical fuel pump, a value zero is given to an input of a low-pass filter and the low-pass filter is initialized using one of a first value of a maximum possible activation output minus a normal precontrol output and a second value corresponding to the first value.

8. The method of claim 7, wherein a time constant of the low-pass filter is a function of a difference between the actual pressure and the setpoint pressure in the pressure region.

9. The method of claim 1, wherein a setpoint pressure in the pressure region is a function of a temperature in a region of the internal combustion engine, at least for the prerun of the electrical fuel pump.

10. A computer program on a tangible computer-readable medium configured to be executed by a computer, the computer program comprising program code for operating an internal combustion engine in accordance with a method including:
    delivering a fuel by an electrically driven fuel pump that includes an intake side connected to a fuel tank and an outlet side connected to a pressure region;
    detecting an actual pressure in the pressure region by the pressure sensor; and
    executing a prerun of the electrically driven fuel pump before startup of the internal combustion engine as a function of at least a signal of the pressure sensor, the prerun including operating the electrical fuel pump initially at maximum output and thereafter at an output level dependent on the signal provided by the pressure sensor.

11. The computer program of claim 10, wherein the computer program is stored in a memory.

12. The computer program of claim 11, wherein the memory includes at least one of a flash memory and a ferrite RAM.

13. A control device for operating an internal combustion engine of a motor vehicle, the comprising:
    a memory configured for storage of a computer program including program code for operating the internal combustion engine in accordance with a method including:

delivering a fuel by an electrically driven fuel pump that includes an intake side connected to a fuel tank and an outlet side connected to a pressure region;

detecting an actual pressure in the pressure region by the pressure sensor; and executing a prerun of the electrically driven fuel pump before startup of the internal combustion engine as a function of at least a signal of the pressure sensor, the prerun including operating the electrical fuel pump initially at maximum output and thereafter at an output level dependent on the signal provided by the pressure sensor.

* * * * *

UNITED STATES PATENT AND TRADEMARK OFFICE
CERTIFICATE OF CORRECTION

| | | |
|---|---|---|
| PATENT NO. | : 7,021,261 B2 | Page 1 of 1 |
| APPLICATION NO. | : 10/451478 | |
| DATED | : April 4, 2006 | |
| INVENTOR(S) | : Klaus Joos et al. | |

It is certified that error appears in the above-identified patent and that said Letters Patent is hereby corrected as shown below:

Column 10, line 64, change "the comprising" to-- the control device comprising--

Signed and Sealed this

Sixth Day of March, 2007

JON W. DUDAS
*Director of the United States Patent and Trademark Office*